United States Patent
Bazhenov et al.

(10) Patent No.: US 6,722,781 B2
(45) Date of Patent: Apr. 20, 2004

(54) MOTION SENSOR FOR FLAT OBJECTS

(75) Inventors: Mykhaylo Bazhenov, Kiev (UA); Dmytro Baydin, Toronto (CA); Oleksandr Lukonin, Thornhill (CA); Bogdan Mishunin, Thornhill (CA)

(73) Assignee: Cashcode Company Inc., Concord (CA)

( * ) Notice: Subject to any disclaimer, the term of this patent is extended or adjusted under 35 U.S.C. 154(b) by 0 days.

(21) Appl. No.: 10/191,465

(22) Filed: Jul. 10, 2002

(65) Prior Publication Data

US 2004/0013158 A1 Jan. 22, 2004

(51) Int. Cl.[7] .................... B54H 43/00; G01K 13/00
(52) U.S. Cl. .................... 374/45; 374/148; 374/185; 73/204.24; 198/502.1
(58) Field of Search ............... 374/45, 29, 39, 374/40, 41, 148, 185, 147, 164; 73/202.5, 204.11, 204.21, 204.22, 204.23, 204.25, 204.26, 204.27, 204.15, 204.24; 198/502.1; 340/588, 589, 595, 596, 673, 674

(56) References Cited

U.S. PATENT DOCUMENTS

| | | | | |
|---|---|---|---|---|
| 3,626,956 A | * | 12/1971 | Sauder ................... 340/673 |
| 4,001,586 A | * | 1/1977 | Fraioli ................... 374/183 |
| 4,203,589 A | * | 5/1980 | Arrasmith ............... 271/258.01 |
| 4,637,736 A | * | 1/1987 | Andeen et al. ............ 374/45 |
| 4,668,102 A | * | 5/1987 | Mott .................... 374/45 |
| 4,734,744 A | * | 3/1988 | Yamamoto ............... 399/402 |
| 4,779,458 A | * | 10/1988 | Mawardi ................ 374/41 |
| 5,207,765 A | * | 5/1993 | Eiermann et al. .......... 374/185 |
| 5,493,100 A | * | 2/1996 | Renger .................. 374/39 |
| 5,682,331 A | * | 10/1997 | Berlin ................... 374/29 |
| 5,753,803 A | * | 5/1998 | Abraham et al. .......... 374/164 |
| 6,406,181 B1 | * | 6/2002 | Mueller et al. ........... 374/185 |

* cited by examiner

Primary Examiner—Diego Gutierrez
Assistant Examiner—Stanley J. Pruchnic, Jr.

(57) ABSTRACT

A simple method and apparatus for contactless rapid and inexpensive motion checking of flat objects, preferably of currency papers. The objects need not be identical in size, thickness, surface appearance, configuration nor deterioration. The checking is carried out by detecting of airflow oscillation under unexpected stoppage of testing object or air movement around the object especially on its front and back edges.

15 Claims, 10 Drawing Sheets

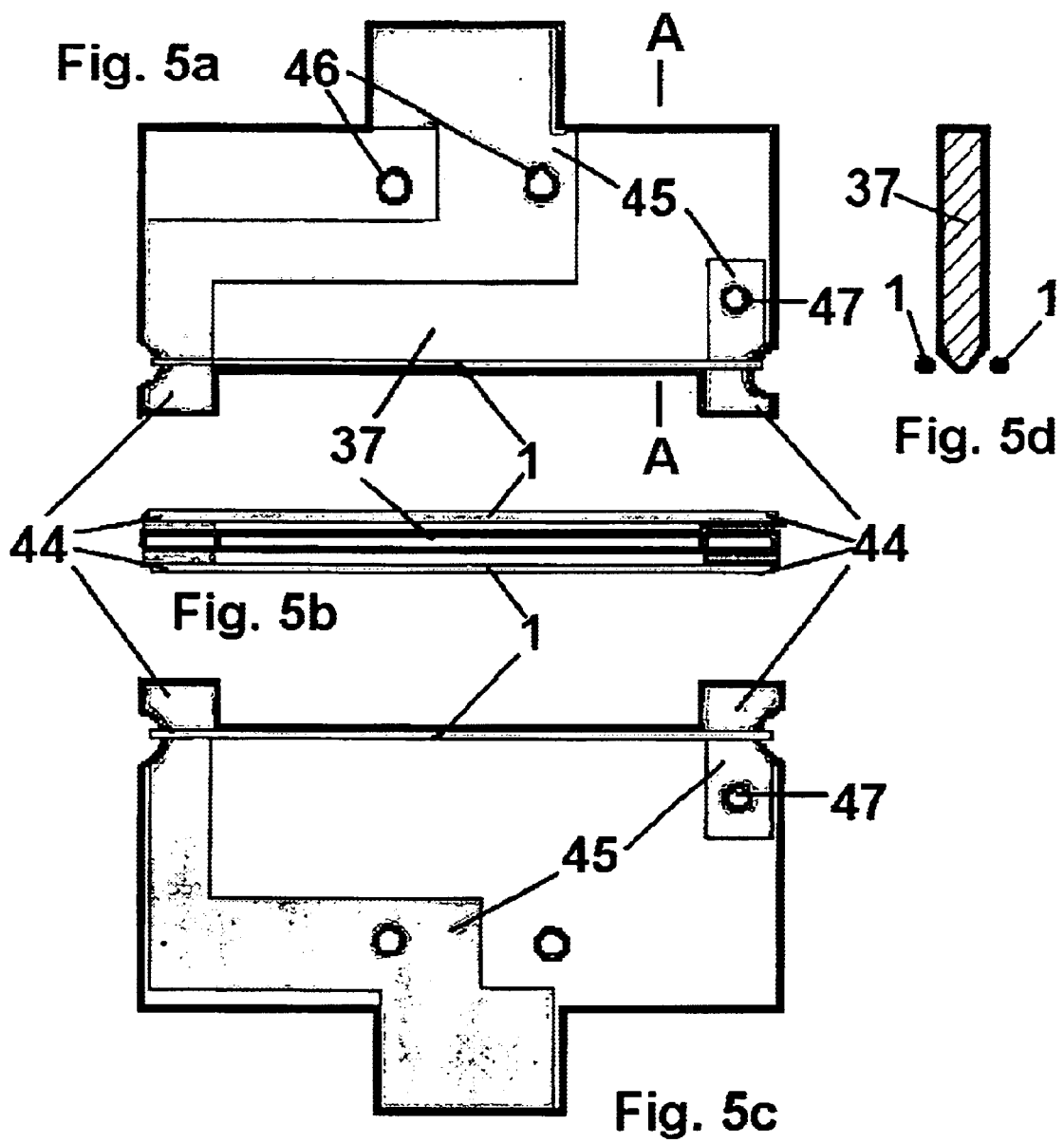

MOTION SENSOR FOR FLAT OBJECTS

FIELD OF THE INVENTION

The present invention is directed to a method and apparatus for assessing the motion of flat objects moved through a channel. In particular, the invention is related to such a method and apparatus where the measurement is based on the output of at least one anemometric sensor affected by the airflow associated with movement of the flat object.

BACKGROUND OF THE INVENTION

Various conventional motion-checking methods are known in the art, e.g., methods of using electromechanical sensors (U.S. Pat. No. 6,220,103; U.S. Pat. No. 6,192,285; U.S. Pat. No. 5,814,778; U.S. Pat. No. 5,324,898, U.S. Pat. No. 4,687,928, etc.), ultrasound methods (U.S. Pat. No. 6,331,964; U.S. Pat. No. 4,414,591, etc.), methods of using piezoelectric sensors (U.S. Pat. No. 5400,012; U.S. Pat. No. 5,258,743 etc.,) capacitive and charge sensitive methods (U.S. Pat. No. 5,391,859, U.S. Pat. No. 4,833,281 etc.), methods of using microwave technique (U.S. Pat. No. 6,333,691, U.S. Pat. No. 4,981,158 etc.), methods of using pyroelectric sensors (U.S. Pat. No. 6,215,399; U.S. Pat. No. 6,163,025; U.S. Pat. No. 4,943,712 etc.), methods of using optical images (U.S. Pat. No. 6,219,455; U.S. Pat. No. 5,824,916; U.S. Pat. No. 5,212,379; U.S. Pat. No. 4,896,966; U.S. Pat. No. 4,099,886 etc.), and its computer processing (U.S. Pat. No. 6,317,136, U.S. Pat. No. 6,188,798; U.S. Pat. No. 5,568,203; U.S. Pat. No. 4,906,846 etc.), methods of using coherent lighting (U.S. Pat. No. 5,212,379; U.S. Pat. No. 4,334,777 etc.). It is difficult or expensive to use any of these methods for evaluating the movement of currency papers due to the changing, size, thickness, material, surface appearance, configuration and deterioration characteristics of currency paper. Currency paper, when moved through a channel, also has a significant vibration making the assessment more difficult.

U.S. Pat. No. 6,203,194 to Beerwerth et al., describes the thin film multipair thermopile sensor for multipurpose motion detector which is provided with diaphragms and/or focusing elements arranged so that a moving object focused images passes by the hot and cold junctions of the sensor element alternatively, causing a corresponding sensor output signal to be generated. However, this method needs a fixed lighting of testing objects and an extensive optical set for focusing a large object to the thermopile sensor.

It is known to include in paper transport arrangement, a paper jam detector (U.S. Pat. No. 4,734,744 and U.S. Pat. No. 4,203,589). An expensive array of optical sensors check the passageway for the absence of a paper sheet in the specified place at the specified point in time. However, all these detectors have a significant time delay between an actual paper jam and the detector identifying a paper jam.

Airflow detection using a previously heated anemometer is known (U.S. Pat. No. 6,101,872; U.S. Pat. No. 5,827,960; U.S. Pat. No. 5,710,380; U.S. Pat. No. 5,629,481; U.S. Pat. No. 5,558,099; U.S. Pat. No. 5,394,883; U.S. Pat. No. 5,272,915; U.S. Pat. No. 5,263,370; U.S. Pat. No. 5,094,105; U.S. Pat. No. 5,081,866; U.S. Pat. No. 4,884,215). However, the prior art detectors are complicated and designed for relative slow movement and cannot detect in real time, short weak airflow vibration typical of airflow vibration waves from leading and trailing edges of a banknote.

The present invention provides a contactless method of sensing the motion or unexpected stoppage of currency papers with arbitrary size, thickness and deterioration, by measurement of the airflow movement around moving currency paper or air movement associated with the unexpected stoppage thereof.

The present invention provides an apparatus for checking the currency paper motion including at least one sensor for real-time measurement of the speed changes of the airflow associated with the motion or unexpected stoppage of currency paper.

In a preferred aspect of the invention, the apparatus contains at least two airflow sensors for measuring the instantaneous speed changes of the airflow associated with the currency paper.

In a further aspect of the invention, the apparatus contains a line of airflow sensors and the signals thereof are processed to provide real-time position information of currency paper edges.

In an aspect of the invention, the apparatus contains a two-dimensional matrix of airflow sensors for detecting the real-time position of currency paper in a transporting channel.

According to yet a further aspect of the invention, a low cost failsafe compact planar heat-loss airflow sensor for sensing changes in airflow is provided.

A preferred motion checking apparatus, according to the present invention, is inexpensive and easily incorporated into banknote validators.

The real-time information about currency paper motion is used to control currency transportation and to reduce paper jams in validity checking machines, including validators, banknote dispensers, and automated payment systems for receiving and dispensing of banknotes.

SUMMARY OF THE INVENTION

The present invention provides an improved contactless method and apparatus for rapid and inexpensive motion checking of flat objects by detecting of air turbulence around the object especially adjacent its front and back edges. The objects need not be identical in surface appearance, configuration and deterioration. The objects preferably may be of substantially any size or thickness and need not be less than some maximum size or within some narrow range of thickness.

A contactless method of checking the motion or unexpected stoppage of flat objects according to the present invention includes measuring the instantaneous cooling rate of a previously heated thin sensor wire or small bead thermistor located in the airflow associated with the moving test object.

All objects that move through an atmosphere cause a corresponding tight-fitting air movement. Thin end moving flat objects produce front and back shock waves that are distinguishable from the almost uniform airflow associated with the middle portion of the object. Unexpected stoppage of a flat object causes vibrations of airflow, especially when objects are thin like currency papers. These shock and vibration airwaves produce a change in airflow which cools the heated thin metal wire with a corresponding decrease of its resistance $\Delta R$. The corresponding voltage drop on this wire $\Delta U = I \times \Delta R$ where I is a current through wire. When NTC thermistor is used one can get the corresponding voltage increase. Alternating component of this signal is practically independent of any surrounding quasi-steady airflow and temperature, whereby the voltage drop is indicative of the motion status of the object.

In accordance with the present invention, an apparatus for motion checking of flat object includes at least one heat-loss sensor located parallel to one side of a testing object with the sensor connected to a steady current source and amplifier which forms a signal proportional to the instantaneous rate of sensor cooling.

Further in accordance with preferred embodiment of the present invention, the heat-loss sensor is connected to an alternating voltage amplifier through derivation circuit. The preferred time constants of amplifier and derivation circuit are similar to typical flat object motion time along the wire or to flat object oscillation period under unexpected stoppage.

Further in accordance with a preferred embodiment of the present invention, the said sensor includes a series of heat-loss elements connected sequentially and positioned at equal distances from one another and parallel to frontal edge of a testing object. To get the optimal time resolution of motion process optimal distance d between adjacent elements is less than $d=3\tau \times \upsilon$, where $\upsilon$ is the rate of object movement, $\tau$—time constant of heated single sensing element.

Still further in accordance with a preferred embodiment of the present invention, the heat-loss sensor includes a two-dimensional ⊥-type matrix of heat-loss elements connected sequentially in each dimension parallel and perpendicular to frontal edge of the testing object respectively, each one-dimensional line of sensors is connected to its own steady current source and amplifier, to form a sequence of pulses in accordance with the testing object motion.

Further in accordance with a preferred embodiment of the present invention, the said sensor is a thin heat-loss sensing wire with a protective housing which accommodates a pulsed airflow under testing object unexpected stoppage.

Still further in accordance with preferred embodiment of the present invention, the apparatus has a semi-closed box with slot for flat object transportation and an air compensation opening with the heat-loss sensing wire associated with the air compensation opening.

Further in accordance with a preferred embodiment of the present invention, the planar heat-loss sensor is a thin mini PC-board with the heat-loss sensing wire alongside printed conductor on said PC-board verge, one sided ends of wire and printed conductor are connected together and another ends are connected to electric scheme such that currents in sensing wire and alongside conductor are equal and anti-parallel.

Still further in accordance with a preferred embodiment of the present invention, the planar heat-loss sensor is a thin mini PC-board with two heat-loss sensing wires alongside to sharpened edge of mini PC-board, one sided ends of wires are connected together and another ends are connected to electric scheme such that currents in alongside wires are equal and antiparallel.

Further in accordance with preferred embodiment of the present invention, the needle-shaped heat-loss sensor is a thin hard metal stem with alongside heat-loss wire, one end of the stem is connected to wire and opposite stem and wire ends are connected to electric scheme through transition mini PC-board such that currents in alongside wire and stem are equal and antiparallel.

Still further in accordance with a preferred embodiment of the present invention, said sensor is a heat-loss small bead thermistor with thin protective coating.

Additionally in accordance with preferred embodiment of the present invention, there is provided a method for checking the time variation of flat testing object momentary speed, including the measuring of difference between instantaneous cooling rates of heat-loss sensor coursed by (located in) the airflow of the testing object airflow and reference heat-lose sensor, placed into undisturbed air.

Additionally provided, in accordance with preferred embodiment of the present invention, is apparatus for checking the time variation of flat testing object momentary speed, including at least two heat-loss sensors each being connected to a steady current source and to differential channels of amplifier, one sensor is situated in the testing object airflow and the other sensor located in undisturbed air for compensation of surrounding temperature and quasi-steady airflow. Steady current sensor's feeding permit to stabilise its temperature, so the method sensitivity practically independent from object speeds.

Additionally in accordance with a preferred embodiment of the present invention, the apparatus includes at least one protective spacer between testing object and heat-loss sensing wire forming the cooling airflow according to movement rate of testing object.

Additionally in accordance with a preferred embodiment of the present invention, there is provided a method for locating the flat object including the formation of the directional to testing object airflow through matrix of air jets with heat-loss sensor in each and measuring instantaneous cooling rates of each sensor coursed by airflow through free jets and jets screened by flat object. The instantaneous cooling rates of sensors screened by testing object is less in comparison with sensors situated in free jets so it is easy to determine the real-time location of testing object and its motion behavior.

Additionally provided, in accordance with a preferred embodiment of the present invention, is apparatus for determine the real-time location of testing object including excess air pressure source, at least one-sided air jets matrix with heat-loss sensor in each jets connected to corresponding steady current source and amplifier, forming the signal proportional to instantaneous rate of sensor cooling.

Further in accordance with a preferred embodiment of the present invention, all heat-loss sensor are connected sequentially to steady current source at that sensor ends are connected through corresponding analog multiplexer to differential inputs of amplifier which forming the output signal respectively to instantaneous cooling rate of sensor situated in permitted channel address.

In operation, the currency paper is moved across the heat-loss sensor with its "narrow" height dimension as the leading edge. The front and back shock waves cause rapid cooling of heated sensor so its resistance quickly changes and we get corresponding voltage drop on this wire $\Delta U$. The variable component of said signals amplified by alternating current amplifier. Point in signals time appearance corresponding to moment of paper front and back edges passing by the sensor wire. If the length L of currency paper is known its average speed may be easy determined as $\upsilon=L/\Delta t$, where $\Delta t$ is the time delay between front and back signals. When the heat-loss sensor consists of plurality of sensing elements connected sequentially and situated on equal distances $d_1$ from one another parallel to frontal edge of currency paper the average speed is $\upsilon_1=d_2/\Delta t_2$, where $\Delta t_2$ is the time interval between adjacent pulses. In two-dimensional ⊥-type matrix elements connected sequentially parallel to frontal edge of testing object operates by described above manner. Connected sequentially sensing elements in orthogonal dimension perpendicular to frontal edge of testing object and situated on the equal distances $d_2$ indicates the transverse shift of testing object with corresponding speed $v_\perp = d_2/\Delta t_2$, where $\Delta t_2$ is the time interval between adjacent pulses from orthogonal sensor. Protective housing round sensor wire prevents it against damage and channeling the airflow to the wire according to testing object motion. The instantaneous cooling rate of heat-loss sensor placed into tight fitting to testing object airflow allows determining the time variation of flat testing object momentary speed. Unexpected stoppage of thin testing object sourses causes deformation and vibration of the object and changes in the airflow associated with the object. The heat-loss sensor detects these changes and produces a corresponding pulse (multi pulse) signal. The planar anemometric sensor has good mechanical durability, technological effectiveness and low cost. The heating current in single or doubles wires planar and needle-shaped sensors flows in opposite directions in alongside thin wire and hard conductor causes the magnetic repulsive force. On the other hand under heating the sensor wire undergoes the thermal extension. Said wire moves away from another conductor (printed or hard) or sensor wire and mini PC-board. So the sensor sensitivity and response speed significantly rises. The formation at least one sided multiunit airflow to testing object with heat-loses sensors in each air jet allows location of the object and allows determination of the motion behaviour thereof.

BRIEF DESCRIPTION OF THE DRAWINGS

Preferred embodiments of the invention are shown in the drawings, wherein:

FIG. 4b is a sectional view along line b—b of FIG. 4a;

FIG. 5a is a front view of a double-wire planar sensor with mini PC-board cross-section;

FIGS. 5b and 5c are respectfully end view and rear view of the double-wire planar sensor of FIG. 5a;

FIG. 5d is a sectional view taken along line a—a of FIG. 5a;

DETAILED DESCRIPTION OF THE PREFERRED EMBODIMENTS

The present invention will be described in detail below with reference to main embodiments illustrated in the accompanying drawings.

Figure 1:
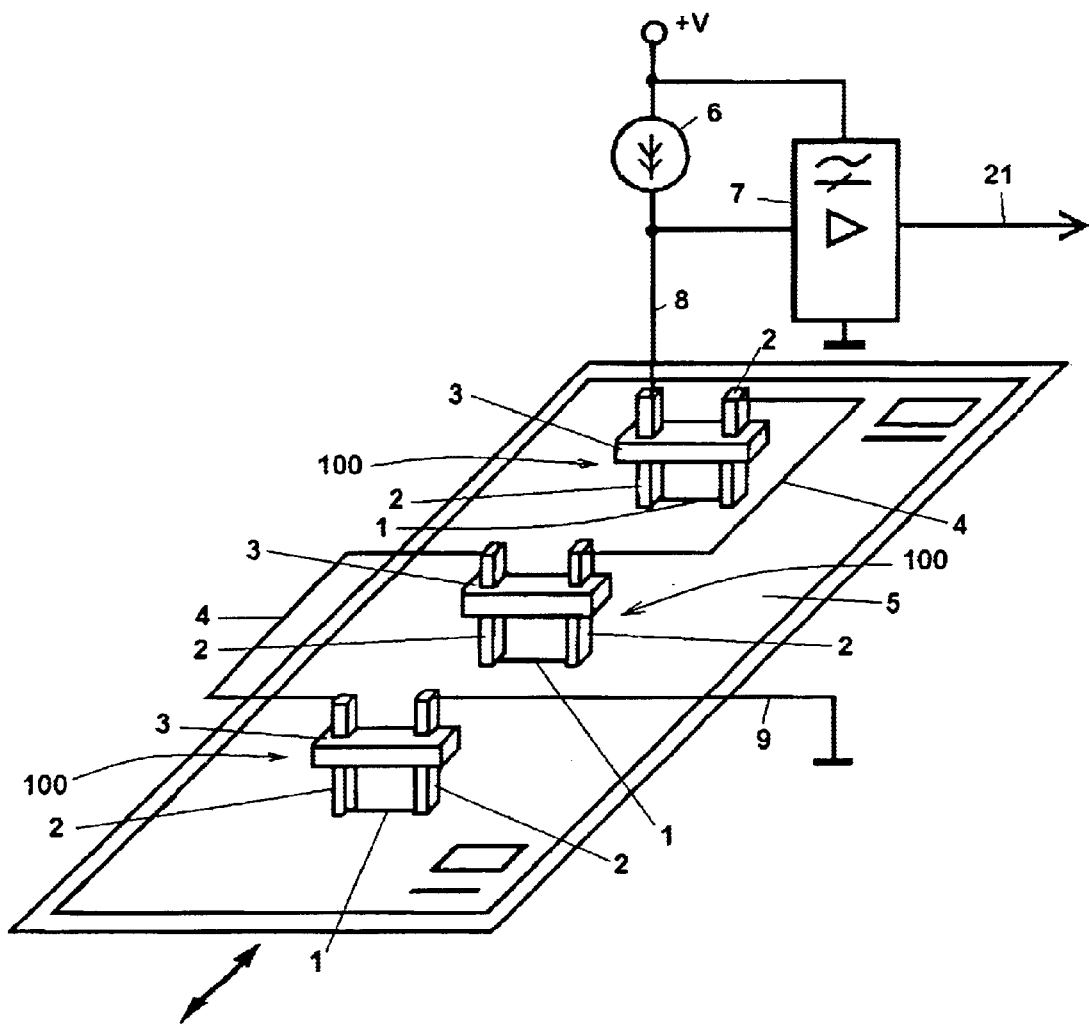
FIG. 1 is a perspective view of currency paper moving under three heat-loses wires connected sequentially to steady current source and amplifier.

FIG. 1 illustrates an example of currency paper motion checking with a linear series of heat-loss sensors 100 connected sequentially to each other. In all illustrations the sensor wire is marked as 1, this wire is welded to stems 2 mounted into holder 3. Wires 4 are intersensor connections. Thermal agitation current flows from power source +V=5 V through steady current source 6, signal conductor 8, sequentially sensors line and ground conductor 9. Desired signal from sensors cooling caused by currency paper 5 motion is amplified by scheme 7. Each sensor responds to front and back shock airflow from currency paper ends so it is easy to determine the space position and average speed of testing object. As can be appreciated, other sensors can scan the bill and identify the denomination, and thus, the size thereof.

Figure 2:
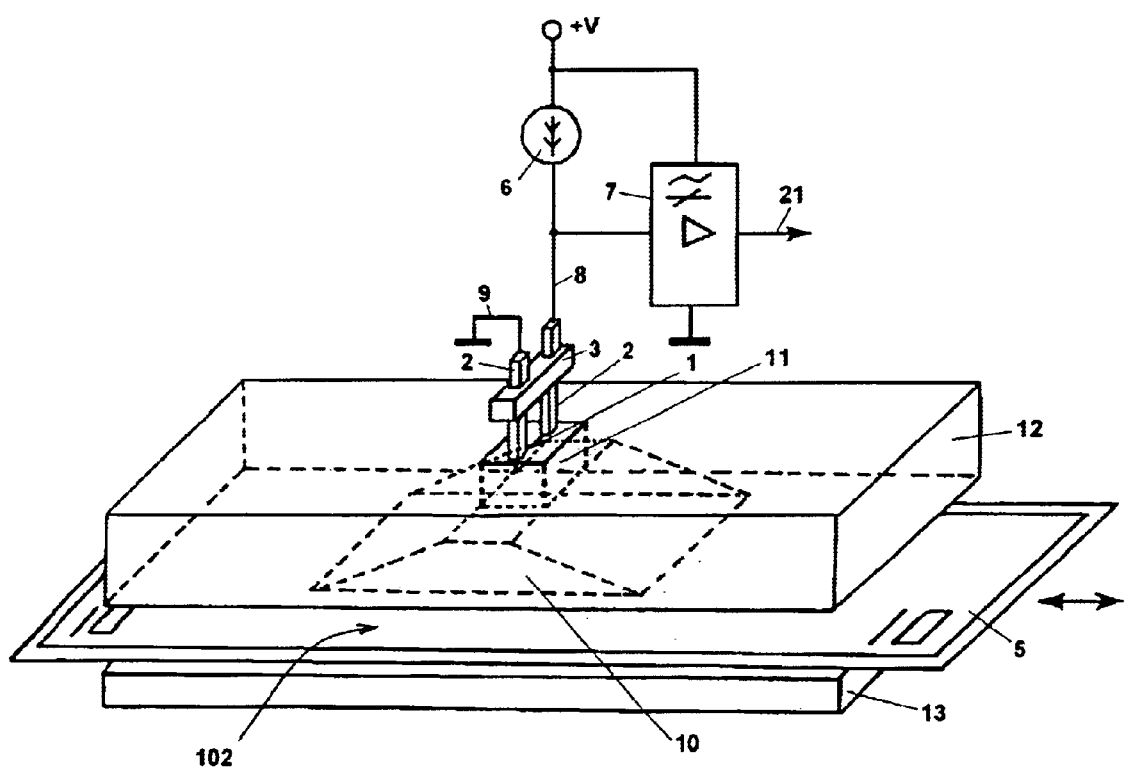
FIG. 2 is a perspective view of heat-loss wire in protective housing forming the pulsed airflow under currency paper unexpected stoppage.

FIG. 2 illustrates an arrangement for checking unexpected stoppage of the paper currency 5 in the transmission tunnel 102 between upper wall 12 and lower wall 13. One wall has inlet 10 with through hole 11. The unexpected stoppage and a bending of the currency paper 5 produces an oscillating airflow in the through hole passage 11. Passage 11 and inlet 10 cooperate to produce the oscillating airflow when paper currency is suddenly stopped, for example, when a paper jam occurs.

The heat-loss sensor wire 1 is placed into opening 11, thermal agitation current flows from power source +V=5 V through steady current source 6, signal conductor 8, sensor wire 1 and ground conductor 9. Signal from sensors wire 1 cooling caused by currency paper 5 bending and vibrations under unexpected stoppage is amplified by scheme 7. The leading edge of first pulse indicates the moment of currency paper 5 unexpected stoppage or braking.

Figure 3:
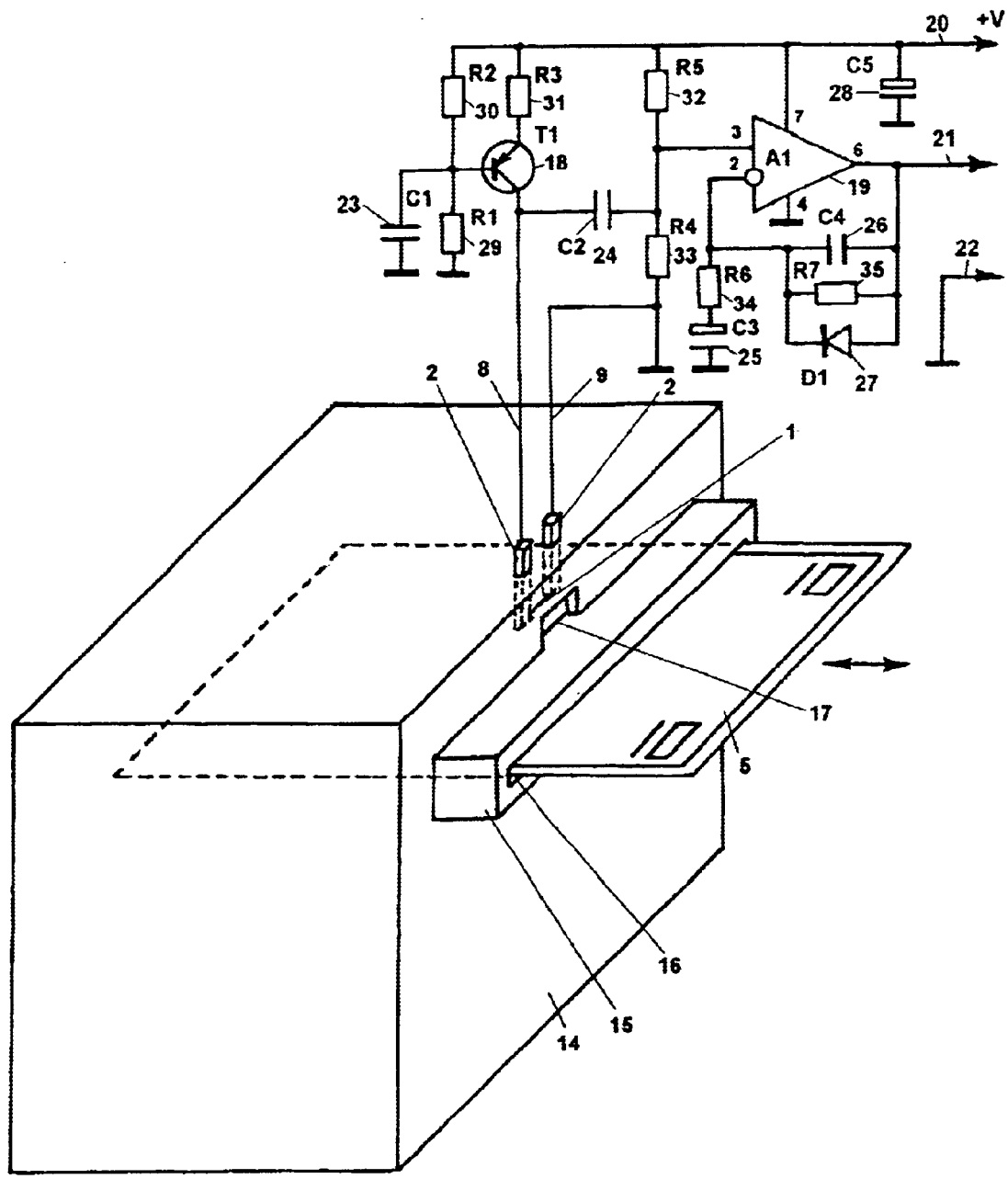
FIG. 3 is a perspective view of semi-closed box with slot for currency paper transportation and air compensation opening with nearby heat-loss sensor connected to steady current sources and alternating voltage amplifier through derivation circuit.

FIG. 3 illustrates an arrangement for checking a currency paper 5 unexpected stoppage or braking when testing paper moves from or into box 14 through slot 16 in director 15 with air compensating opening 17. The heat-loss sensor wire 1 is placed not far from opening 11 and for protecting against damage it may be separated from currency paper with special spacer. In the upper part of FIG. 3 the steady current source and amplifier schematic diagram is shown. Transistor 18 ($T_1$ is 2N4403) with resistors 29–31 and acceleration capacitor 23 forms the steady current source. Capacitor 24 with resistors 32, 33 forms the derivation circuit, amplifier is constructed on chip 19 ($A_1$ is OP07EP) with negative feedback elements 25, 26, 27, 34, 35. Diode 27 ($D_1$ is 1N914B) is used for transient acceleration. Conductor 21 is OUTPUT signal, 20—power supply (+5 V), 22—neutral (ground) conductor. The values for all of the resistors and capacitors comprising the circuitry of FIG. 3 are given in Tables I and II, respectively.

TABLE 1

| Reference NO | 29 | 30 | 31 | 32 | 33 | 34 | 35 |
|---|---|---|---|---|---|---|---|
| Resistor NO | R1 | R2 | R3 | R5 | R4 | R6 | R7 |
| Resistance value (Ohms) | 430 | 560 | 30 | 220K | 510K | 3K | 2,0 M |

TABLE II

| Reference NO | 23 | 24 | 25 | 26 | 28 |
|---|---|---|---|---|---|
| Capacitor NO | C1 | C2 | C3 | C4 | C5 |
| Capacitate value | 2,2 µF | 0,22 µF | 2,2 µF | 150 pF | 0,0 µF |

Steady current 70 mA from transistor T1 18 provides the heat-loss sensor wire 1. The dissipated power on heat-loss sensor wire 1 at that is about 30 mWt, corresponding wire reheat temperature is about 130° C. At ambient temperature 20° C. the total wire temperature is 150° C. The said reheat temperature faintly depends of ambient temperature, the temperature fall under airflow cooling is much less in comparison with reheat temperature (8,5/130=0,065) so the method sensitivity is practically constant. For example, under ambient temperature change from 0° C. to 40° C. method sensitivity rises only about 20%. The amplifier A1 19 is provided by desired signal through derivation circuit C2 24, R4 33, R5 32 so the steady component of output signal is independent of environmental temperature. Diode $D_1$ 27 accelerates transient process after desirable negative pulses and at turning on apparatus.

Figure 4A:
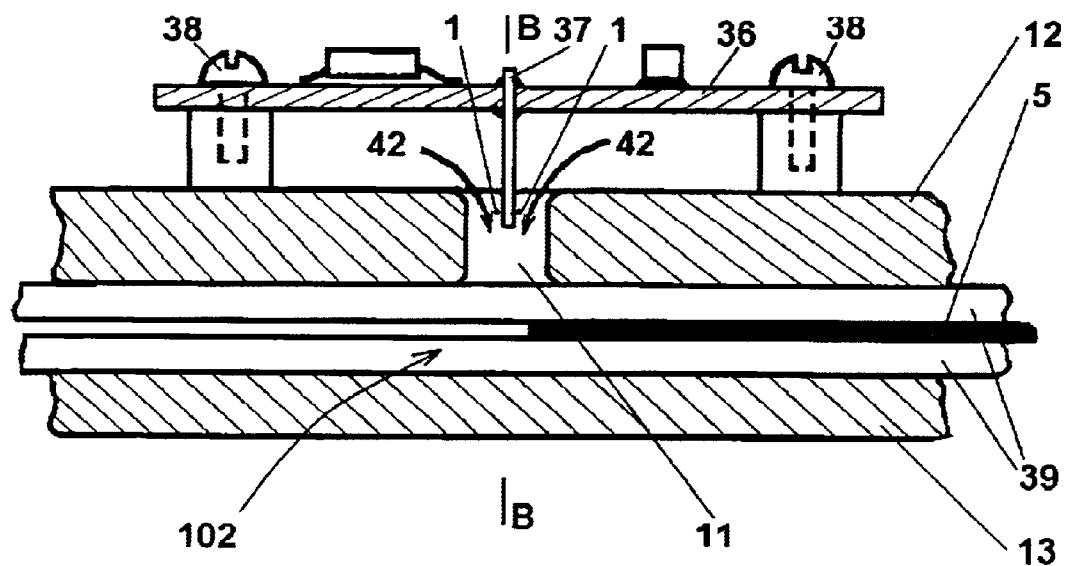
FIG. 4a is a side view of an airflow detection arrangement.
Figure 4B:
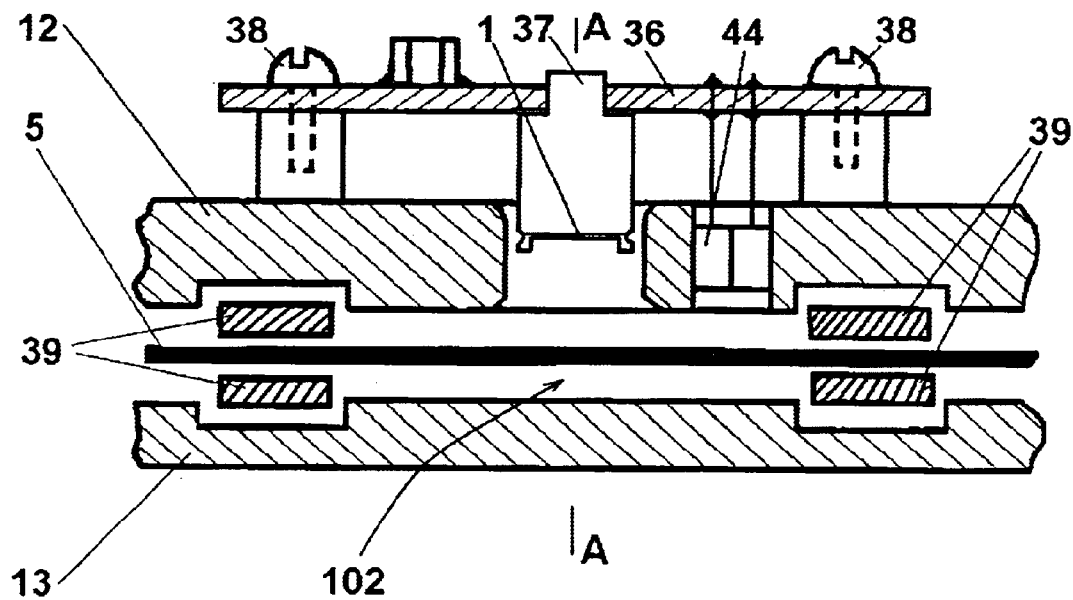

FIGS. 4a and 4b illustrate an arrangement for airflow detection from leading and trailing edges of currency paper 5 passing in transmission tunnel 102 between upper 12 and lower 13 walls. One wall has through hole 11 which receives the airflow pulses under leading and trailing edges of currency paper 5 passing. The planar heat-loss sensor 37 with heating wires 1 is placed into opening 11 and soldered to PC-board 36. This PC-board is fixed on upper wall 12 with screws 38 leaving the rear edge of opening 11 unobstructed. Arrows 42 shows the airflow caused by trailing edge when currency paper 5 is leaving the transmission tunnel. Reflective optical sensor 43 indicates the currency paper 5 presence in transmission tunnel. Embodiment on FIG. 4 is preferably for airflow detection from leading and trailing edges of currency paper 5 because of retaining and damping action of transporting belts 39.

The belts 39 tend to reduce airflow turbulence portions of a banknote intermediate the leading and trailing edges. The airflow disturbance caused by the leading edge or trailing edge passing the flow through opening 11 is more easily recognized even though the belts tend to reduce the signal strength. The banknote evaluation channel is not large in cross section as the position of the banknote relative to the sensors is tightly controlled the gap either side of the banknote is preferably 1 to 2 mm.

The PC-board 36 mounted in a spaced manner from the rear of the evaluation channel and have several sensors thereon extending into ports in the channel simplifies manufacture. It is also possible to combine the pass through opening 11, the PC-board 36 and the sensors in a replaceable module mounted in a flush manner in the evaluation channel.

The heat-loss sensor used in embodiments of FIG. 1–FIG. 3 has a thin tungsten wire (diameter about 8 mkm) welded to the ends of square manganin stems (0.64×0.64 mm). The total wire length is about 2.54 mm (resistance≈4 Ohm), the active length is about 1.9 mm. The optimal steady current through this wire is 70 mA, the average working temperature is 150° C. The stems are mounted into high temperature Glass-filled PCT holder which protected wire against damage. The free stem ends are connected to electrical circuit by means of standard 2-pin socket or by soldering. The heating time (from 20 to 150° C.) of this wire with tight-fitting air layer is about 0.4 sec by 70 mA heated current and 0.25 sec under forced heating (0.16 A during 0.05 sec). The typical time response of this sensor for airflow modulation is less than 5 msec. The optimal testing object speed is 300 mm/sec. Time constants of used derivation circuit and alternative current amplifier are about 30 msec so the space resolution of sensors line or matrix is about 9 mm. The amplifier gain is about 160, typical output voltage is about −3V so the decrease of sensor resistance under airflow cooling is 0.25 Ohm and corresponding temperature fall is about 8.5° C.

FIGS. 5a, 5b, 5c, and 5d illustrate the planar heat-loss sensor used in the embodiment of FIGS. 4a and 4b. This planar sensor has a thin (≈0,1 mm) mini PC-board 37 with two heat-loss sensing platinum wires 1 spaced outwardly to one side of the narrow edge of the PC board. Ends of wires are soldered at points 44 to printed conductors 45. Right wire ends are connected together through transition open 47 and the opposite ends are connected to said electric scheme by means of mounting opens 46 or by direct soldering into the slot on main PC-board. The working length of each wire is about 5 mm. Under heating each sensor wire undergoes the thermal extension and due to magnetic repulsive force between antiparallel currents wires move away from each other up to 0,3 mm. The heating time (from 20 to 150° C.) of this sensor wires with tight-fitting air layer is about 0.5 sec. The typical time response of this sensor for modulated airflow from any direction (except from PC-board) is less than 10 msec, total sensitivity is almost 2 times greater in comparison with single wire sensor of same size.

Figure 6A:
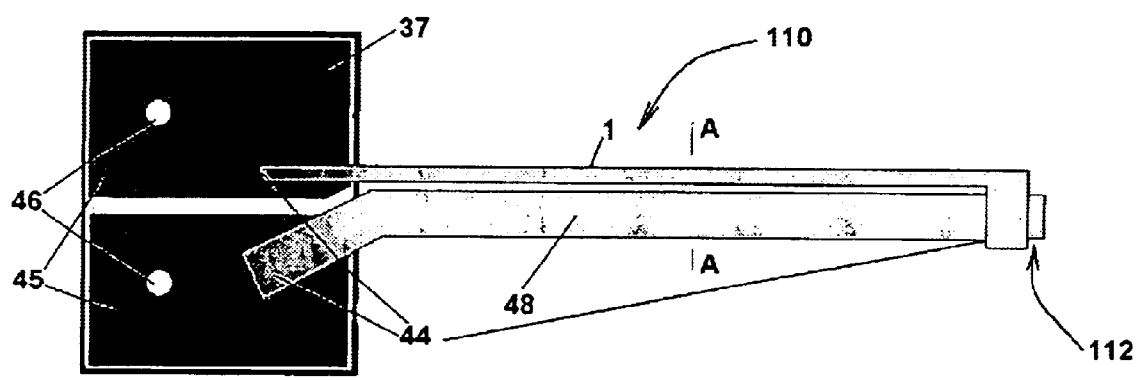
FIG. 6a is a front view of a needle-shaped sensor with sensing element and FIG. 6b is a section view along line c—c.
Figure 6B:
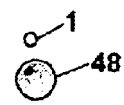

FIGS. 6a and 6b illustrate the needle-shaped heat-loss sensor 110 for use in narrow passages or for selective directional sensitivity. This needle-shaped sensor has a transition mini PC-board 37 with printed conductors 45 and mounting opens 46. Left ends of thin (≈0,3 mm) steel stem 48 and platinum sensor (length about 15 mm) wire 1 are soldered to printed conductors 45. Right ends of said stem and wire are soldered together at 112. Under heating sensor wire undergoes the thermal extension and due to magnetic repulsive force between antiparallel currents in wire and stem said wire moves away from the stem up to 0,5 mm. The heating time (from 20 to 150° C.) of this sensor with tight-fitting air layer is about 0.7 sec. The typical time response of this sensor for airflow modulation is less than 7 msec when the airflow is directed to the sensor wire. The sensor sensitivity and speed of response decrease up to 50 times when sensor wire is in the stem air shadow.

Another (more expensive) type of heat-loss sensor that can be used in all embodiments, is a heat-loss small bead thermistor with thin glass protective coating, for example, FP07 by THERMOMETRICS, INC. At working current 3 mA($R_{T=25°\ C.}$=3 kOhm) such sensor has good sensitivity and fast response about 1–3 msec for airflow directions to the sensor side and tip respectively.

Figure 7:
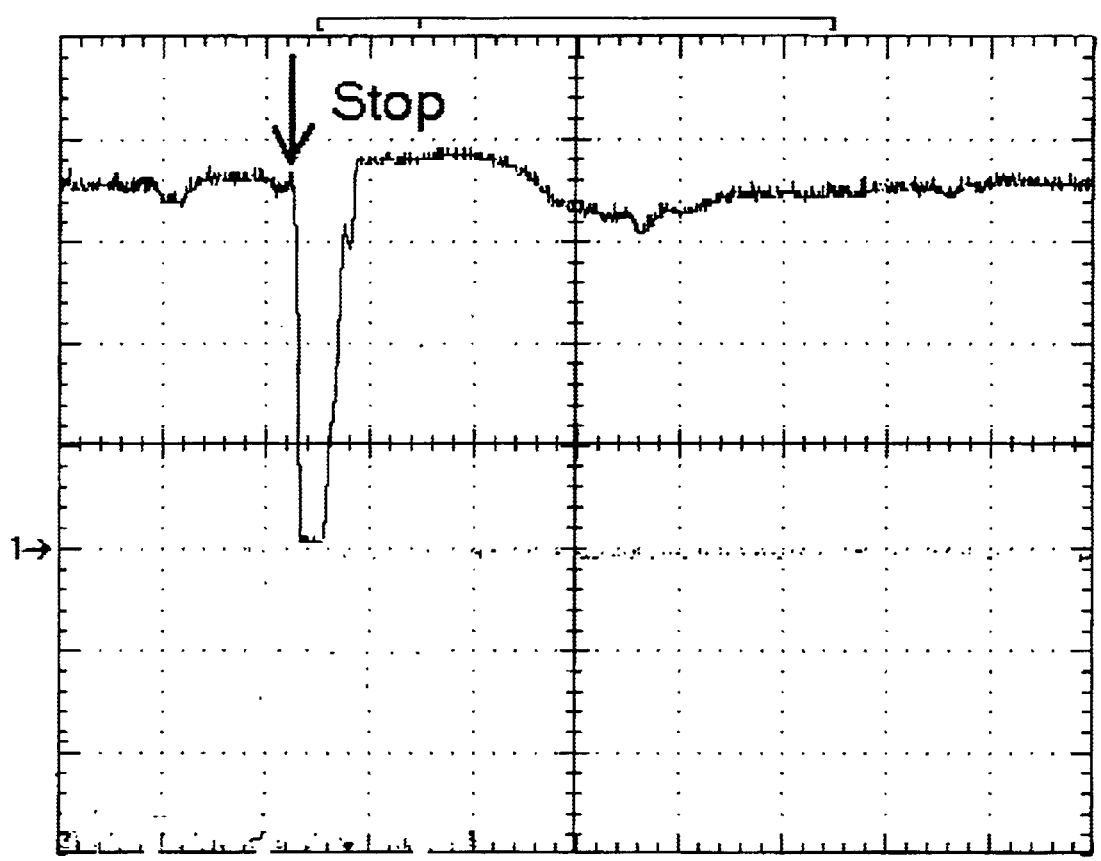
FIG. 7 is a typical signal of currency paper unexpected stoppage in FIG. 3 embodiment.

FIG. 7 is an example of a typical signal of currency paper unexpected stoppage in the embodiment of FIG. 3. Arrow ↓Stop indicates the point in time of stoppage. Arrow 1→ indicates the zero level of output signal. Oscilloscope TEKTRONIX TDS220 with TDS2MM Measurement Module was used, multiplying factors are X–50 msec/point, Y–1 V/point. Under unexpected stoppage the currency paper is bending and produces an airflow through the compensating opening 17 and corresponding rapid cooling of heat-loss wire 1. The output signal indicates this sudden cooling and is used as a trigger to activate an emergency stoppage of the currency paper.

Figure 8:
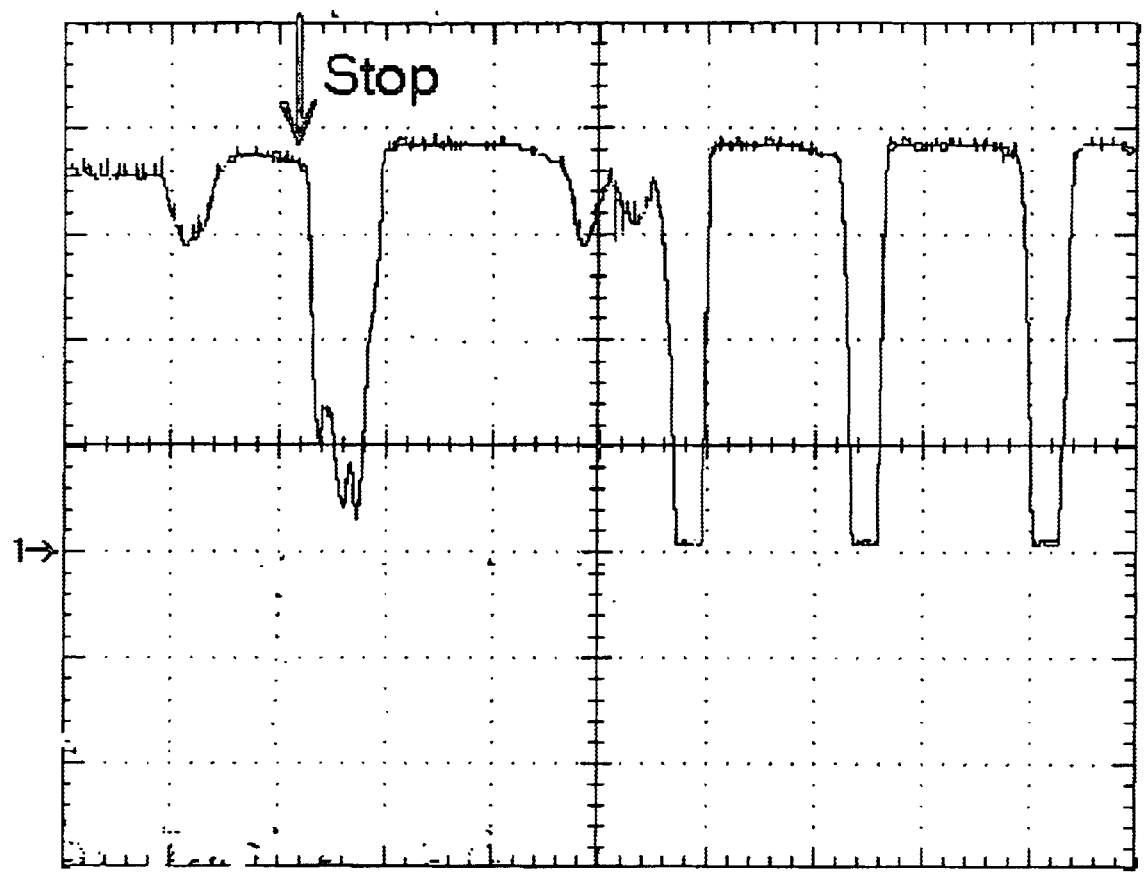
FIG. 8 is a typical signal of currency papers jumble in FIG. 3 embodiment.

FIG. 8 illustrates an example of a currency paper jam in the embodiment of FIG. 3. Arrow ↓Stop indicates the point in time when stoppage of the first currency paper occurs. Arrow 1→ indicates the zero level of the output signal. The initial output pulses (similar to described above) indicates the stoppage of first paper. The successive currency papers overtake the first paper and each cause additional stoppage with output signals formed as described above.

Figure 9:
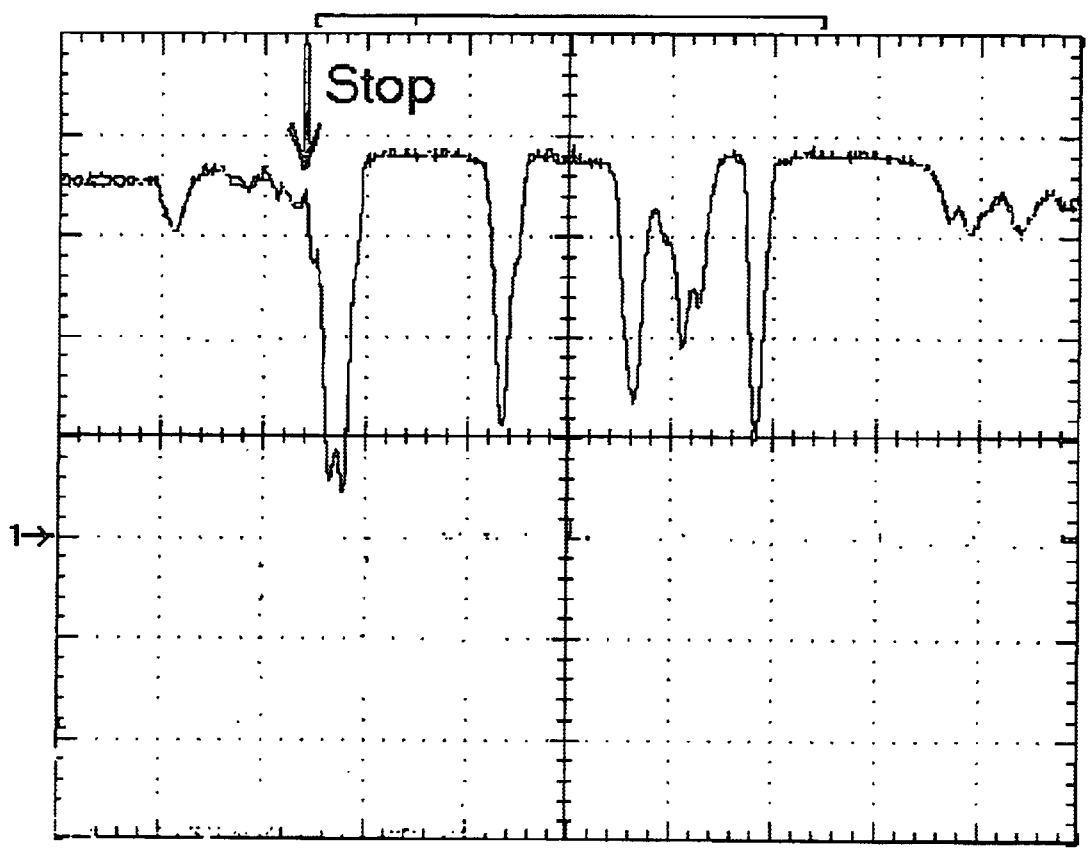
FIG. 9 is a typical signal of currency paper oscillation under unexpected stoppage in FIG. 2 embodiment.

FIG. 9 is an example of currency paper vibration under unexpected stoppage in the embodiment of FIG. 2. Arrow ↓Stop indicates the point in time when stoppage of the leading edge of the currency paper occurred. Arrow 1→ indicates the zero level of output signal. After unexpected stoppage of leading edge, the currency paper begins to vibrate and forms a fold, and causes oscillation airflow in opening 11 (FIG. 2). This airflow courses the variable cooling of heat-loss wire 1 with respective multipulses output signal. The emergency stop of currency paper can be done at the leading edge of the first pulse to reduce the folding of the bill.

Figure 10:
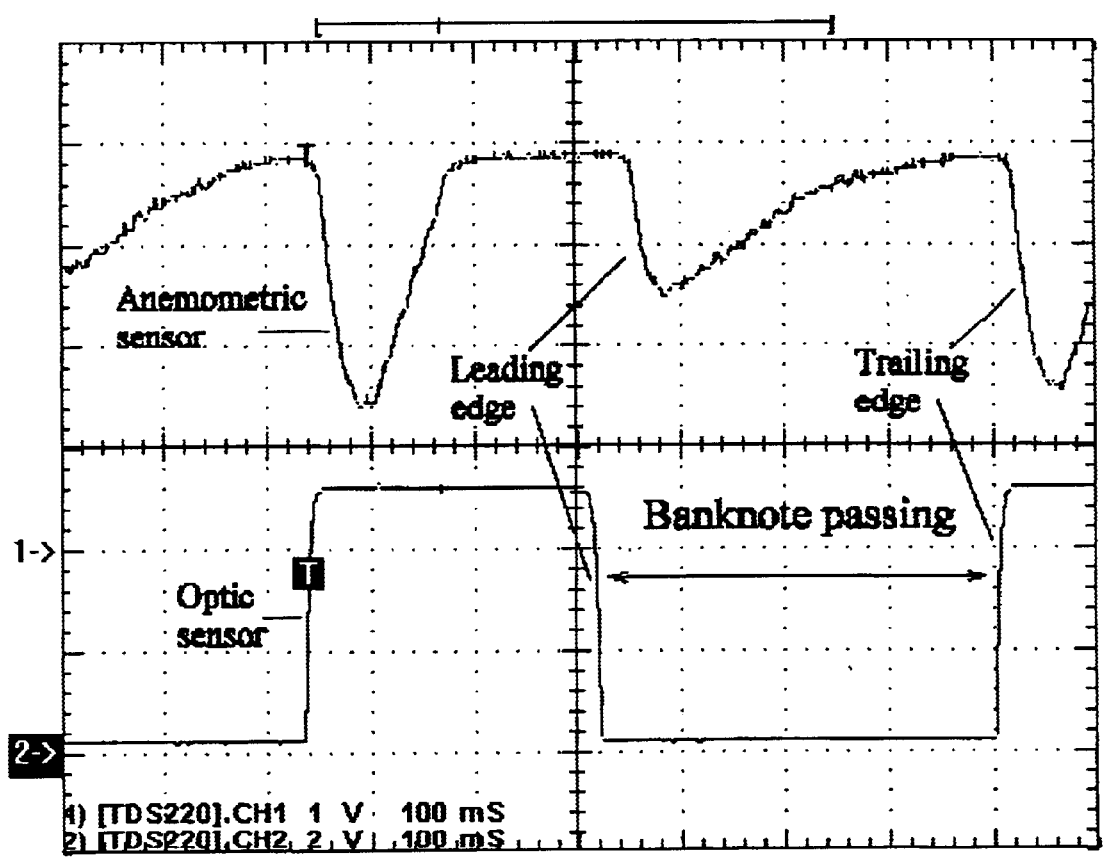
FIG. 10 is a typical graph of the output of the anemometric sensor and a traditional optical sensor in FIG. 4 embodiment at normal currency paper movement.

FIG. 10 is a graph of the signals of the movement of a series of banknotes, one after another moving past the thermoanemometric sensor of FIG. 4 and an optic sensor. The time constant of the derivation circuit and amplifier is about 1 sec, the amplifier gain is 500. The thermoanemometric and optic sensors are aligned and arranged parallel to the leading edge of the banknote.

The present invention is described herein in the context of a currency paper motion application as for a verification device, automatic cash machine or other currency paper handling device, in a bank, postal facility, supermarket, casino or transportation facility. However, it is appreciated that the embodiments shown and described herein may also be useful for motion checking other objects, particularly flat objects, such as sheets of paper in printers and photocopy machines. Motion of bills, films, plates, metal foils and cards can also be sensed. The checking device may be stationary or portable, battery powered or powered by connection to an electric outlet.

It is appreciated that various features of the invention, which are, for clarity, described in the contexts of separate embodiments, may also be provided in combination in a single embodiment. Conversely, various features of the invention which are, for brevity, described in the context of a single embodiment, may also be provided separately or in any suitable combination.

It will be appreciated by persons skilled in the art that the present invention is not limited to what has been particularly shown and described above. Rather, the scope of the present invention is defined only by the claims that follow.

The particular sensing structure shown in FIG. 2 allows the airflow to actually move into and away from the banknote passageway. The opening in cavity close to the sensor shown in FIG. 3 allows the airflow to pass into and out of the cavity. This opening greatly improves the sensitivity of the sensor and method.

The present invention relates to methods and apparatus for motion checking of banknotes which can be used for motion control of currency papers. The control process includes additional components including hardware controlled and software controlled components. The control procedure may differ in various types of apparatus. The sensor and method may be used for sensing:

the leading edge of pulse used for emergency stop of apparatus;
the leading edge of pulse used for temporary alternate/reciprocal banknote motion;
the anemometric and optical sensor signals together are used for program calculation of banknote speed and position;
the anemometric sensor signal is used for termination of present transport process and activation of reserve;
the anemometric sensor signal is used for banknote necessary allocation in passageway; and
the anemometric sensor signal is used for banknote sizing.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of sensing the motion of paper comprising:
   moving the paper through an evaluation channel,
   sensing the airflow in said evaluation channel using an anemometric heat loss sensor the resistance of which changes as a function of said airflow,
   evaluating the output signal of the heat loss sensor for a sudden change in resistance of the sensor caused by atmospheric turbulence associated with the movement of the paper in said evaluation channel.

2. A method as claimed in claim 1 wherein said method evaluates turbulence associated with the leading or trailing edge of paper as the paper is moved through said evaluation channel.

3. A method as claimed in claim 1 including locating said anemometric heat loss sensor in an open ended passageway connected to said evaluation channel.

4. A method as claimed in claim 3 including providing a flow of air through said passageway and flowing toward said evaluation channel which is opposed by an opposite flow of air caused by said turbulence associated with said movement of said paper through said evaluation channel, and analyzing the output of said aremometric sensor for conditions indicative of the movement of a leading edge or trailing edge of said paper past said passageway.

5. An arrangement for sensing the movement of a paper currency through an evaluation channel comprising an evaluation channel, means for moving the paper currency through the evaluation channel, an airflow passageway with one end thereof opening into said evaluation channel and exposed to any air turbulence associated with the movement of the paper currency through said evaluation channel, an anemometric heat loss sensor located in said passageway and cooled by any airflow through said passageway, said airflow through said passageway being varied by the turbulence associated with the movement of said paper currency through said evaluation channel, and means for measuring the changes in the resistance of said sensor and using said measured changes as indicative of the movement of said paper currency.

6. An arrangement as claimed in claim 5 wherein said heat loss sensor is located parallel to one side of testing object and said arrangement includes a steady current source and an amplifier which forms a signal proportional to instantaneous rate of wire sensor cooling.

7. An arrangement as claimed in claim 6 wherein the heat loss sensor is connected to an alternating voltage amplifier through a derivation circuit, said amplifier and derivation circuit having time constants approximately equal to typical flat object motion time along the sensor or to flat object oscillation period under unexpected stoppage.

8. An arrangement as claimed in claim 7 wherein said sensor includes a linear plurality of heat loss elements connected sequentially and equally spaced from each other and located parallel to a frontal edge of the paper currency under evaluation.

9. An arrangement as claimed in claim 6 or 7 wherein said sensor includes a two dimensional type matrix of heat loss elements connected sequentially in each dimension parallel and perpendicular to frontal edge of testing object respectively, each one dimensional line of heat loss elements is connected to its own steady current source and amplifier to form a sequence of pulses in accordance with testing object motion.

10. An arrangement as claimed in claim 5 wherein said heat-loss sensor is a thin heat-loss sensing wire with a protective housing which accommodates a pulsed airflow under testing object unexpected stoppage.

11. An arrangement as claimed in claim 5 wherein said heat-loss sensor is planar and includes a thin mini PC-board with heat-loas sensing wire alongside printed conductor on said PC-board verge, one sided ends of wire and printed conductor are connected together and another ends are connected to electric scheme such that currents in sensing wire and alongside conductor are parallel but opposite in direction.

12. An arrangement as claimed in claim 5 wherein said heat-loss sensor is planar and includes a thin mini PC-board with two heat-loss sensing wires spaced either side of an edge of said mini PC-board, one sided ends of wires are connected together and another ends are connected to electric scheme such that currents in alongside sensing wires are parallel but opposite in direction.

13. An arrangement as claimed in claim 5 wherein said heat-loss sensor is a needle-shaped heat-loss sensor having a thin hard metal stem with alongside heat-loss wire, one end of the stem is connected to wire and opposite stem and wire ends are connected to electric scheme through transition mini PC-board such that currents in alongside sensing wire and stem are parallel but opposite in direction.

14. An arrangement as claimed in claim 5 wherein said heat-loss sensor is a heat-loss small bead thermistor with thin protective coating.

15. An arrangement as claimed in claim 5 wherein said arrangement has a semi-closed box with slot for currency papers transportation and at least one air compensation opening with said heat loss sensor near it.

* * * * *